(12) United States Patent
Minami (10) Patent No.: US 7,513,849 B2
(45) Date of Patent: Apr. 7, 2009

(54) AUTOMATED TRANSMISSION CONTROLLER AND VEHICLE INCLUDING THE AUTOMATED TRANSMISSION CONTROLLER

(75) Inventor: Kengo Minami, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 429 days.

(21) Appl. No.: 11/514,017

(22) Filed: Aug. 31, 2006

(65) Prior Publication Data

US 2007/0243973 A1    Oct. 18, 2007

(30) Foreign Application Priority Data

Apr. 18, 2006   (JP)   .............................. 2006-114702

(51) Int. Cl.
*B60W 10/00*    (2006.01)

(52) U.S. Cl. ........................................................ 477/78

(58) Field of Classification Search ................ 192/3.56, 192/3.62, 3.63
See application file for complete search history.

(56) References Cited

U.S. PATENT DOCUMENTS

| | | | |
|---|---|---|---|
| 1,500,878 | A | 7/1924 | Kruchten |
| 5,121,649 | A | 6/1992 | Randriazanamparany et al. |
| H2031 | H | 6/2002 | Harrell et al. |
| 6,481,554 | B1 | 11/2002 | Ota |
| 6,502,681 | B1 | 1/2003 | Ota |
| 2004/0118652 | A1 | 6/2004 | Muetzel et al. |
| 2006/0094567 | A1 | 5/2006 | Kosugi et al. |
| 2006/0124422 | A1 | 6/2006 | Zenno |
| 2006/0128525 | A1 | 6/2006 | Zenno |
| 2006/0128527 | A1 | 6/2006 | Zenno et al. |
| 2006/0160660 | A1 | 7/2006 | Zenno et al. |
| 2006/0169561 | A1 | 8/2006 | Ooishi et al. |
| 2006/0169562 | A1 | 8/2006 | Kosugi |
| 2006/0169569 | A1 | 8/2006 | Ooishi et al. |

FOREIGN PATENT DOCUMENTS

| | | |
|---|---|---|
| DE | 4336445 A1 | 4/1995 |
| DE | 19709419 A1 | 10/1997 |
| DE | 19853333 | 6/1999 |
| DE | 10107962 | 8/2002 |
| DE | 10253809 A1 | 11/2002 |
| DE | 10327438 | 1/2004 |

(Continued)

OTHER PUBLICATIONS

EPO European Search Report for EP 06025982, completed Feb. 6, 2007.

(Continued)

*Primary Examiner*—Dirk Wright
(74) *Attorney, Agent, or Firm*—Knobbe, Martens, Olson & Bear, LLP (57) ABSTRACT

A transmission controller can be configured to initially operate a shift actuator to start a gear change process. Additionally, the controller can be configured to perform a process for reducing engine driving force, such as, but without limitation, an ignition delaying process, a fuel injection quantity reducing process, an air quantity reducing process, or another process simultaneously with the initiation of the gear change. After an elapse of a predetermined time from initiation of gear change, a clutch actuator can be operated to start disconnection of a clutch.

19 Claims, 10 Drawing Sheets

FOREIGN PATENT DOCUMENTS

| | | |
|---|---|---|
| DE | 10304588 | 4/2004 |
| DE | 10306934 | 9/2004 |
| DE | 10393681 | 10/2005 |
| EP | 0129417 | 12/1984 |
| EP | 0328362 | 8/1989 |
| EP | 0590240 A2 | 4/1994 |
| EP | 0635391 | 1/1995 |
| EP | 0887220 | 12/1998 |
| EP | 0987467 A2 | 3/2000 |
| EP | 1122116 | 8/2001 |
| EP | 1342930 A2 | 9/2003 |
| EP | 1365176 A2 | 11/2003 |
| EP | 1469236 A | 10/2004 |
| EP | 1555461 | 7/2005 |
| EP | 1666772 A | 6/2006 |
| FR | 0 490 730 A1 | 6/1992 |
| GB | 2170571 | 8/1986 |
| JP | 43-11555 | 5/1968 |
| JP | 58-152938 | 9/1983 |
| JP | 60-86631 | 6/1985 |
| JP | 61-024858 | 2/1986 |
| JP | 62-017631 | 1/1987 |
| JP | 62-80192 | 4/1987 |
| JP | 62-75414 | 5/1987 |
| JP | 62-110532 | 5/1987 |
| JP | 02-118269 | 5/1990 |
| JP | 03-172675 | 7/1991 |
| JP | 03-290030 | 12/1991 |
| JP | 4-266619 | 9/1992 |
| JP | 05-026065 | 2/1993 |
| JP | 05-039865 | 2/1993 |
| JP | 08-061487 | 3/1996 |
| JP | 11-082710 | 3/1999 |
| JP | 3044498 | 3/2000 |
| JP | 2000-205411 | 7/2000 |
| JP | 2001-050389 | 2/2001 |
| JP | 2001-146930 | 5/2001 |
| JP | 2001-173685 | 6/2001 |
| JP | 2001-280493 | 10/2001 |
| JP | 2002-067741 | 3/2002 |
| JP | 2002-243034 | 8/2002 |
| JP | 2003-329064 | 11/2003 |
| JP | 2005-282784 | 10/2005 |
| JP | 2006-017721 | 1/2006 |
| WO | WO 91/10979 | 7/1991 |
| WO | WO 98/24008 | 6/1998 |
| WO | WO 02/25131 | 3/2002 |
| WO | WO 2004/005743 | 1/2004 |
| WO | WO 2004/094177 | 11/2004 |

OTHER PUBLICATIONS

EPO European Search Report for EP 06025981, completed Feb. 16, 2007.
EPO European Search Report for EP 06025877, completed Feb. 12, 2007.
EPO European Search Report for EP 06025734, completed Feb. 8, 2007.
EPO European Search Report for EP 06025732, completed Feb. 9, 2007.
EPO European Search Report for EP 06025609, completed Feb. 5, 2007.
EPO European Search Report for EP 06025607, completed Feb. 5, 2007.
EPO European Search Report for EP 06025606, completed Feb. 5, 2007.
Co-Pending U.S. Appl. No. 11/514,387, filed Aug. 31, 2006. Title: Clutch Failure Detector, Automatic Clutch System, and Straddle-Type Vehicle.
Co-Pending U.S. Appl. No. 11/514,386, filed Aug. 31, 2006. Title: Clutch Control Device and Vehicle.
Co-Pending U.S. Appl. No. 11/514,000, filed Aug. 31, 2006. Title: Automatic Shift Control Device and Vehicle.
Co-Pending U.S. Appl. No. 11/513,609, filed Aug. 31, 2006. Title: Automated Transmission Controller and Vehicle Including the Automated Transmission Controller.
Co-Pending U.S. Appl. No. 11/513,537, filed Aug. 31, 2006. Title: Automatic Gearshift Control Device and Vehicle.
Co-Pending U.S. Appl. No. 11/469,268, filed Aug. 31, 2006. Title: Clutch Actuator, Engine Unit, and Straddle Type Vehicle.
Co-Pending U.S. Appl. No. 11/469,310, filed Aug. 31, 2006. Title: Clutch Actuator, Engine Unit, and Straddle Type Vehicle.
Co-Pending U.S. Appl. No. 11/469,228, filed Aug. 31, 2006. Title: Clutch Actuator, Engine Unit, and Straddle Type Vehicle.
Co-Pending U.S. Appl. No. 11/469,252, filed Aug. 31, 2006. Title: Shift Actuator, Vehicle and Method of Integrating Vehicle.
Co-Pending U.S. Appl. No. 10/591,285, filed Aug. 31, 2006. Title: Riding Type Vehicle.
Co-Pending U.S. Appl. No. 10/591,560, filed Aug. 31, 2006. Title: Speed Change Controller for Straddle-Ride Type Vehicles.
Co-Pending U.S. Appl. No. 10/591,559, filed Aug. 31, 2006. Title: Shift Control for Straddle-Type Vehicle, and Straddle-Type Vehicle.
Co-Pending U.S. Appl. No. 10/591,284, filed Aug. 31, 2006. Title: Actuation Force Transmission Mechanism and Straddle-Type Vehicle.

AUTOMATED TRANSMISSION CONTROLLER AND VEHICLE INCLUDING THE AUTOMATED TRANSMISSION CONTROLLER

CROSS-REFERENCE TO RELATED APPLICATIONS

This application claims the priority benefit of Japanese Patent Application No. 2006-114702, which was filed on Apr. 18, 2006 and which is hereby incorporated by reference in its entirety.

BACKGROUND OF THE INVENTIONS

1. Field of the Inventions

The present inventions relate to an automated transmission controller which can automatically execute shift changes, and to a vehicle including the automated transmission controller.

2. Description of the Related Art

Recently, vehicles with electronically actuated manual transmission have become commercially available. These transmissions are largely the same as any conventional manual transmission, except electronic actuators have been added to allow the otherwise manual transmission to be operated electronically.

The actuators are used to automate certain operations so that the system can automate a series of start, stop and shift change operations (clutch disengagement, gear change, and clutch engagement) based on the rider's intention or the state of the vehicle. For example, Japanese Patent Documents JP-A-2001-146930 and JP-A-2001-173685 disclose transmission controllers which control the operation of the actuators (clutch actuator and shift actuator) such that processes for disconnection of the friction clutch, gear change of the transmission, and half-clutch control over the friction clutch (connecting operation) can be performed in this order at the time of shift change.

SUMMARY OF THE INVENTIONS

An aspect of at least one of the embodiments disclosed herein includes the realization, the shift change operation performed by the above transmission controller requires the friction clutch to be disengaged for an unnecessarily long period of time which thereby unnecessarily causes following problems. In shift-up operations, and in particular, after significant acceleration has been provided immediately before the shift-up operation, the unnecessarily long disengagement of the clutch can make the rider feel uncomfortable. Moreover, during higher-speed operation, wind resistance is larger, and thus, if the clutch the disengaged for an unnecessarily long period of time, the vehicle slows excessively. When these problems occur, the riding experience adversely affected.

Thus, in accordance with an embodiment, an automated transmission controller can comprise a friction clutch and a transmission having a plurality of first gears on which engaging projections are formed and a plurality of second gears on which engaging concaves are formed, the engaging concaves configured to be engaged with the engaging projections, the transmission being configured to effect gear changes through the engagement of the engaging projections of the first gears with the engaging concaves of the second gears. The controller can also include a clutch actuator configured to connecting and disconnecting the friction clutch and a shift actuator configured to cause at least one of the first and second gear to move so as to engage the engaging projections with the engaging concaves and thereby executing a gear change of the transmission. A control unit can be configured to control operations of the clutch actuator and the shift actuator. Additionally, the control unit can be configured to initially operate the shift actuator to start a gear change of the transmission and then to operate the clutch actuator to start disconnection of the friction clutch.

Such a transmission controller can provide enhanced transmission performance. For example, where the disconnection of the friction clutch is started after initiation of gear change, the time during which the clutch is disengaged can be shorter than that resulting from the shift change operations in the above identified related arts. As a result, the period of non-acceleration resulting during the gear change, which is even more significant during higher speed operation generating higher wind resistance, can be reduced thus providing the rider with a more pleasing riding experience.

In accordance with another embodiment, an automated transmission controller can comprise a friction clutch, a transmission having a plurality of gears defining a plurality of gear ratios, a clutch actuator configured to connecting and disconnecting the friction clutch, a shift actuator configured to cause the transmission to shift between the plurality of gear ratios. The controller can also comprise means for initially operating the shift actuator to start a gear change of the transmission and then to operate the clutch actuator to start disconnection of the friction clutch based on a single gear shift command from a user of the transmission controller.

BRIEF DESCRIPTION OF THE DRAWINGS

These and other features, aspects and advantages will now be described with reference to drawings of a preferred embodiment. The drawings comprise the following figures.

DETAILED DESCRIPTION OF PREFERRED EMBODIMENTS

Figure 1:
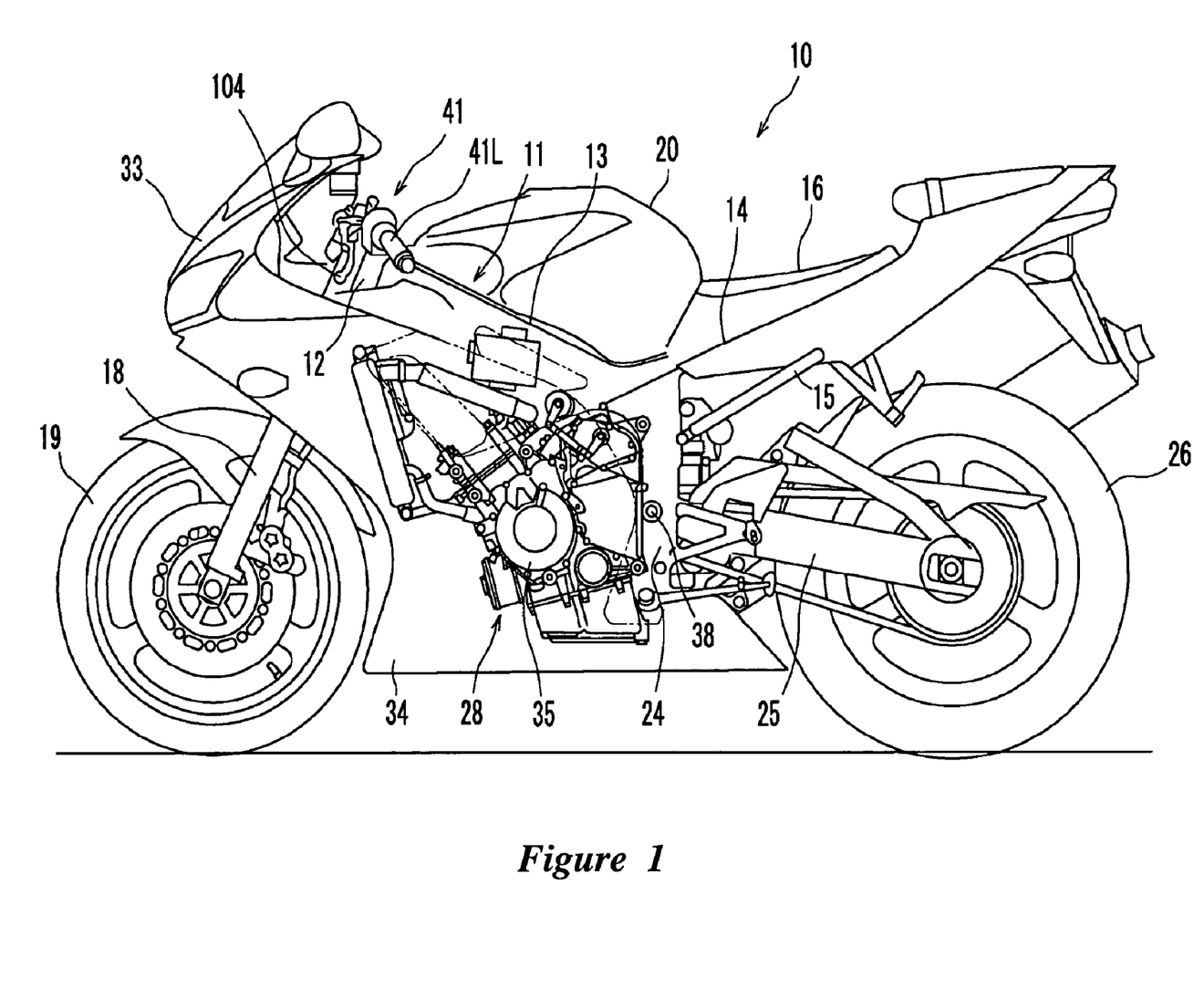
FIG. 1 is a side elevational view of a motorcycle constructed in accordance with an embodiment.

FIG. 1 is a side view of a motorcycle 1 having a transmission arranged and configured in accordance with an embodiment. The transmission is disclosed in the context of a motorcycle because it has particular utility in this context. However, the transmission can be used in other contexts, such as, for example, but without limitation, scooters, automobiles, as well as other vehicles.

With continued reference to FIG. 1, the motorcycle 10 includes a vehicle body frame 11 defining a framework, and a seat 16 on which a rider sits. The seat 16 is configured such that the rider straddles the seat, astride the vehicle body frame 11, during operation.

The shape of the motorcycle 10 is not limited to that shown in FIG. 1, nor are the maximum speed, displacement volume, size, and other conditions of the vehicle limited thereto. Additionally, the inventions disclosed herein are not limited to a so-called motorcycle-type two-wheel vehicle which includes a fuel tank before the seat, but are applicable to other types of two-wheel vehicles. Moreover, the inventions disclosed herein are not limited to two-wheel vehicles, but may be used with other types of saddle-type vehicle. Furthermore, the inventions disclosed herein are not limited to saddle-type vehicles, but can be used with other types of vehicles such as four-wheel buggy for two riders.

In the following description, the front-and-rear direction and the left-and-right direction are defined as viewed by the rider sitting on the seat 16.

With continued reference to FIG. 1, the vehicle body frame 11 can have a steering head pipe 12, a main frame 13 extending diagonally downward to the rear from the steering head pipe 12, left and right seat rails 14 extending diagonally upward to the rear from the immediate position of the main frame 13, and left and right seat pillar tubes 15 connected with the rear end of the main frame 13 and the intermediate positions of the seat rails 14.

A front wheel 19 can be supported by the steering head pipe 12 via a front fork 18. A fuel tank 20 and the seat 16 can be supported on the seat rails 14. The seat 16 can extend from above the fuel tank 20 toward the rear ends of the seat rails 14. The fuel tank 20 can be disposed above the front half parts of the seat rails 14.

A pair of left and right rear arm brackets 24 can be provided at the rear end of the main frame 13. In this embodiment, the rear arm brackets 24 and other components provided on the main frame 13 can be considered as forming a part of the vehicle body frame 11. However, other configurations can also be used.

The rear arm brackets 24 project downwardly from the rear end of the main frame 13. Pivot shafts 38 can be equipped on the rear arm brackets 24, and the front ends of rear arms 25 can be supported by the pivot shafts 38 such that the rear arms 25 can freely swing. A rear wheel 26 can be supported by the rear ends of the rear arms 25.

An engine unit 28 for driving the rear wheel 26 can be supported by the vehicle body frame 11. A crank case 35 can be supported by the main frame 13 in such a manner as to be suspended therefrom. In some embodiments, a gasoline engine (not shown) can be provided in the engine unit 28. However, the engine included in the engine unit 28 is not limited to an internal combustion engine such as a gasoline engine, but may be an electric motor, a hybrid gasoline, electric system, or other types of propulsion systems.

The motorcycle 10 can also include a front cowl 33 and left and right leg shields 34. The leg shields 34 can cover components covering the front parts of the rider's legs. However, other configurations can also be used.

Though not shown in FIG. 1, a brake pedal can be equipped in the lower right area of the motorcycle 10. The brake pedal can be a component for braking the rear wheel 26. The front wheel 19 can be braked by operating a brake lever (not shown) provided in the vicinity of a right grip 41R (see FIG. 2) of a handlebar 41.

A clutch lever 104 can be disposed in the vicinity of a left grip 41L of the handlebar 41. In some such embodiments, engagement and disengagement of the clutch can be effected also by operating the clutch lever 104 as well as automatically, described in greater detail below.

Figure 2:
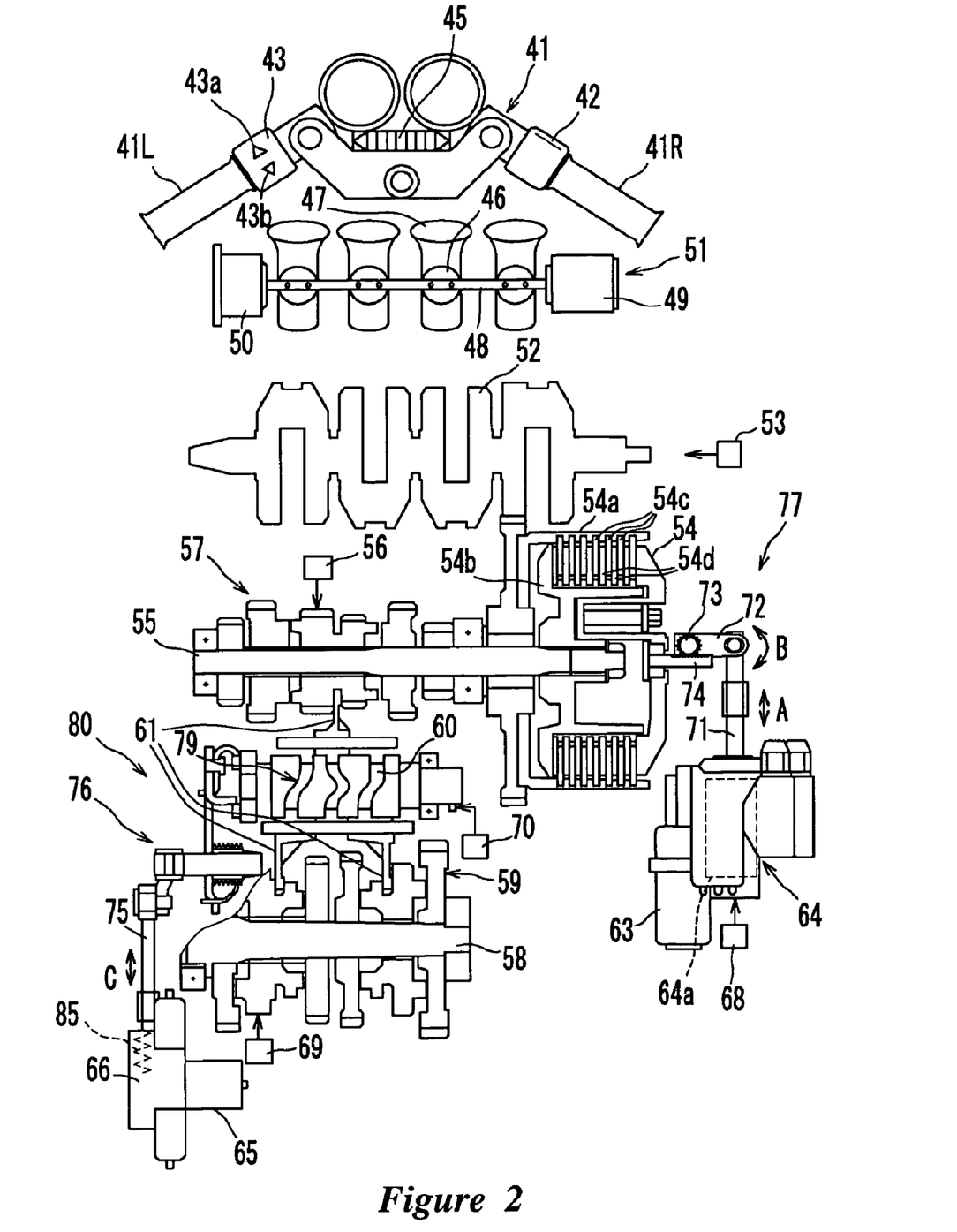
FIG. 2 is a partial exploded and schematic view of a drive system of the motorcycle shown in FIG. 1, the drive system including a transmission.

FIG. 2 illustrates a structure of a driving system that can be used with the motorcycle shown in FIG. 1. In some embodiments, the right grip 41R of the handlebar 41 (see also FIG. 1) comprises a rotatable accelerator grip. A throttle input sensor 42 can be attached to the accelerator grip.

The throttle input sensor 42 can be configured to detect acceleration input (throttle opening input) given by the rider, which can also be referred to as a torque request or power output request. A shift switch 43 can be disposed on the left grip 41L of the handlebar 41, although other locations can also be used.

With continued reference to FIG. 2, the shift switch 43 can include a shift-up switch 43a and a shift-down switch 43b, thereby giving the operator a device for requesting increases and decreases in the gear position. For example, in some embodiments, the motorcycle can be shifted in the range between the neutral position and the maximum gear position (e.g., 6 gear positions in an exemplary but non-limiting embodiment) by manual operation. An indicator 45 can be configured to display the current shift position or the like can be provided at the center of the handlebar 41.

Throttle valves 46 can be attached to throttles bodies 47, which can be considered as forming an air intake passages. A throttle drive actuator 49 can be attached to one end (the right end in the illustrated embodiment) of a valve shaft 48 to which the throttle valves 46 can be rotatably connected. A throttle opening sensor 50 can be attached to the other end (the left end in the illustrated embodiment) thereof. The throttle drive actuator 49 and the throttle opening sensor 50 attached to the valve stem 48 can be considered as forming a DBW (drive by wire) 51 system. However, other configurations can also be used and considered as forming a drive by wire system. The DBW 51 can be configured to open and closes the throttles 47 through the throttle drive actuator 49 based on the detection results from the throttle opening sensor 50, as well as other calculations and/or determinations, described in greater detail below.

An engine revolution sensor 53 can be configured to detect rotation of the crankshaft 52. In the illustrated embodiment, the engine revolution sensor 53 is disposed on the right side of a crankshaft 52. However, other positions can also be used.

The crankshaft 52 can be connected to a main shaft 55 via a wet multi-disc-type clutch 54, although other types of clutches can also be used. The clutch 54 can have a clutch housing 54a and a clutch boss 54b. A plurality of friction plates 54c can be attached to the clutch housing 54a, and a plurality of clutch plates 54d can be attached to the clutch boss 54b. Each of the clutch plates 54d can be interposed between the adjoining friction plates 54c, 54c. As noted above, other types of clutches can also be used, including, but without limitation, a dry clutch or a single-plate-type clutch.

The main shaft 55 can have multiple-position (six positions in FIG. 2) transmission gears 57 and a main shaft revolution sensor 56. Each of the transmission gears 57 attached to the main shaft 55 can engage with a corresponding transmission gears 59 attached onto a drive shaft 58 disposed parallel with the main shaft 55. In FIG. 2, the transmission gears 57 and the transmission gears 59 are separated so as to simplify the explanation.

The transmission gears 57, 59 are attached such that either or both of the gears 57, 59, other than the selected gears, are attached to the main shaft 55 or drive shaft 58 during idling of the engine. Thus, driving force can be transmitted from the main shaft 55 to the drive shaft 58 only through a selected pair of the transmission gears. The condition in which the pair of the transmission gears 57 and 59 engage with each other and transmit driving force from the main shaft 55 to the drive shaft 58 is referred to as "gear-in" condition or the "gear position".

The operation for selecting or meshing the desired pair of transmission gears 57 and transmission gears 59 and changing between such pairs can be performed with a shift cam 79. The shift cam 79 can have a plurality of cam grooves 60 (three grooves are illustrated in FIG. 2, although other numbers of grooves can also be used), and shift forks 61 are attached to the respective cam grooves 60.

The respective shift forks 61 engage with the predetermined transmission gears 57 and 59 of the main shaft 55 and drive shaft 58. When the shift cam 79 rotates, the shift forks 61 move along the cam grooves 60 in the axial direction and accordingly the predetermined transmission gears 57, 59 engaging with the splines of the main shaft 55 and drive shaft 58 move in the axial direction. Then, the transmission gears 57, 59 having moved in the axial direction engage with another pair of the transmission gears 57, 59 attached to the main shaft 55 and drive shaft 58 in idling condition to complete the gear change process. The transmission gears 57, 59 and the shift cam 79 can be considered as forming a transmission 80, although other configurations can also be used to form the transmission 80.

Figure 3:
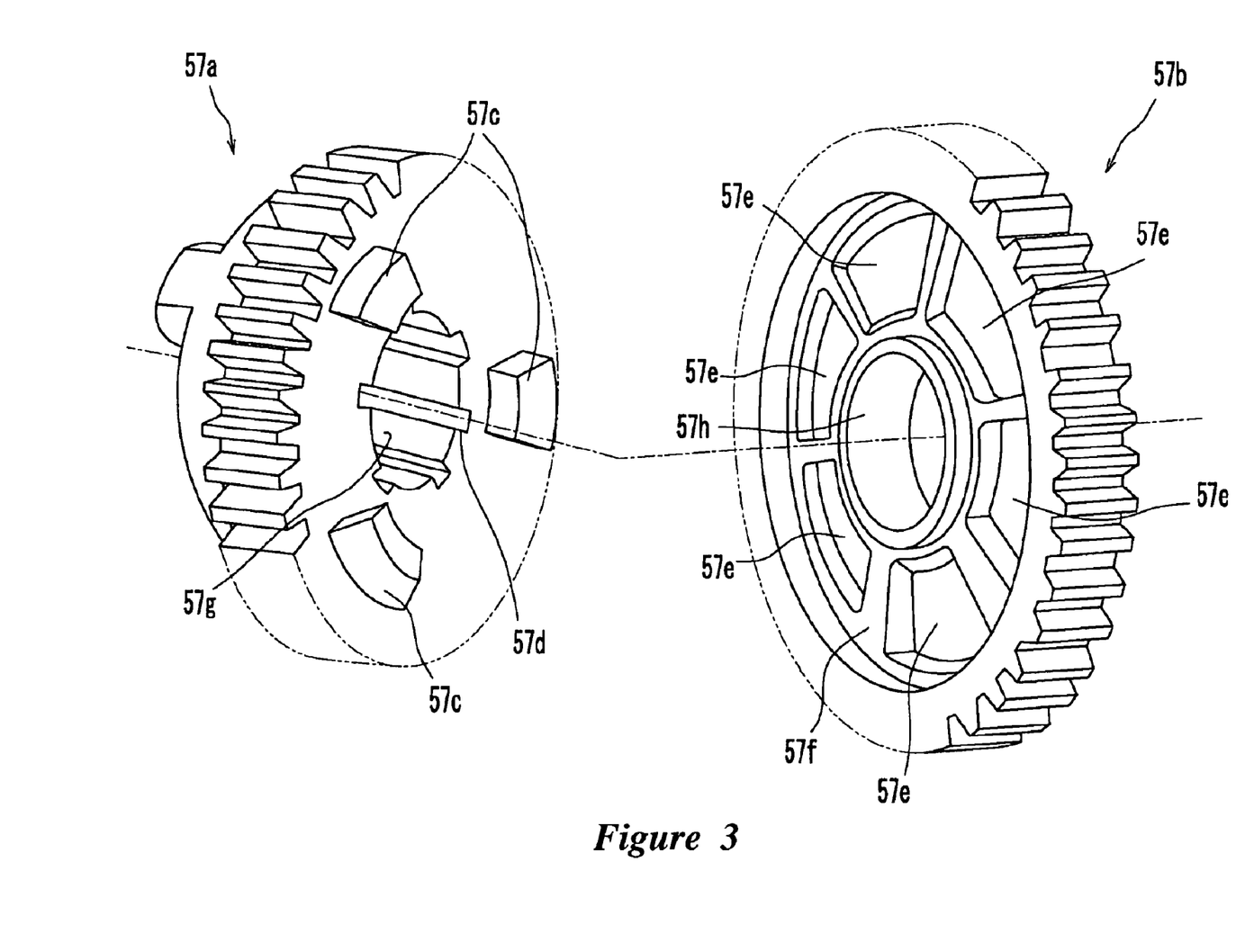
FIG. 3 is a perspective view of two gears that can be used in the transmission of FIG. 2.

The transmission 80 can be a dog-clutch-type transmission. As illustrated in FIG. 3, each of the transmission gears 57 of the transmission 80 has a first gear 57a having engaging projections 57c on an axial end surface thereof, and a second gear 57b having engaging concaves 57e on its axial end surface opposed to the engaging projections 57c. The transmission 80 can include a plurality of first gears 57a and second gears 57b. Also, the transmission 80 can include a plurality of first gears having engaging projections and a plurality of second gears having engaging concaves as the transmission gears 59. Since these structures of the transmission gears 59 are similar to those of the first gears 57a and second gears 57b shown in FIG. 3, explanation of the transmission gears 59 is not repeated herein.

Each of the first gears 57a has the three engaging projections 57c disposed at equal intervals on the outer edge of its axial end surface in the circumferential direction. Each of the second gears 57b has the six engaging concaves 57e also disposed at equal intervals in the circumferential direction. However, other numbers of projections 57c and concaves 57e can also be used.

An insertion hole 57g through which the main shaft 55 and the drive shaft 58 are inserted is formed at the axial center of the first gear 57a. A plurality of grooves 57d are provided along the circumference of the insertion hole 57g. The first gear 57a engages with the splines of the main shaft 55 and the drive shaft 58. The second gear 57b has an insertion hole 57h through which the main shaft 55 and the drive shaft 58 are inserted, but the insertion hole 57h does not have grooves around the hole. Thus, the second gear 57b can be attached to the main shaft 55 and the drive shaft 58 in idling condition.

When the shift cam 79 (FIG. 2) rotates, the shift forks 61 move along the cam grooves 60 and accordingly, the first gear 57a moves along the splines of the main shaft 55 and the drive shaft 58 in the axial direction. Then, the engaging projections 57c of the first gear 57a come to engagement with the engaging concaves 57e of the second gear 57b, thereby changing the combination of the transmission gears 57, 59 for transmitting the driving force from the main shaft 55 to the drive shaft 58 and completing the gear change process.

Additionally, when the shift cam 79 (FIG. 2) rotates, the first gear 57a moves in the axial direction. At this step, the engaging projections 57c of the first gear 57a do not engage with the engaging concaves 57e of the second gear 57b but contact an axial end face 57f of the second gear 57b in dog-contact condition in some cases. Under the dog-contact condition, the first gear 57a and second gear 57b do not engage but contact with each other, failing to securely attain gear change.

As illustrated in FIG. 2, the clutch 54 and the transmission 80 can be operated by a clutch actuator 63 and a shift actuator 65, respectively. The clutch actuator 63 can be connected with the clutch 54 via a hydraulic transmission mechanism 64, a rod 71, a lever 72, a pinion 73, and a rack 74.

The hydraulic transmission mechanism 64 can also include a hydraulic cylinder 64a, an oil tank (not shown), a piston (not shown) and other components. The hydraulic transmission mechanism 64 can also be configured to generate hydraulic pressure by the operation of the clutch actuator 63 and transmits the hydraulic pressure to the rod 71. The rod 71 thus reciprocates in the direction indicated by an arrow A by the operation of the clutch actuator 63, thereby rotating the lever 72 in the direction indicated by an arrow B. As a result, the clutch 54 can be connected or disconnected in accordance with the movement direction of the rack 74. While an electric motor can be used as the clutch actuator 63 in some embodiments, other devices such as a solenoid and an electromagnetic valve, or other actuators can also be used.

An automated transmission controller can comprise the transmission 80, the shift actuator 65, a deceleration mechanism 66, a rod 75, a link mechanism 76, an ECU 100 (FIG. 4) for controlling the operations of the clutch actuator 63 and shift actuator 65. However, other configurations can also be used. An automated clutch device 77 can comprise the clutch 54, the clutch actuator 63, the hydraulic transmission mechanism 64, the rod 71, the lever 72, the pinion 73, and the rack 74. However, other configurations can also be used.

The shift actuator 65 can be connected with the shift cam 79 via the deceleration mechanism 66, a spring 85, the rod 75, and the link mechanism 76. The deceleration mechanism 66 can have a plurality of reduction gears (not shown).

The spring 85 can be configured to urge the rod 75 in accordance with the operation of the shift actuator 65. The spring 85 can be any type of spring, any type of elastic or resilient member such as an elastic resin, or any type of device that can generate a biasing force.

The spring 85 can be not required to urge the rod 75 as in this embodiment as long as the spring 85 urges at least a part of the power transmission mechanism (deceleration mechanism 66, the rod 75 and the link mechanism 76) provided between the shift actuator 65 and the transmission 80. For example, the spring 85 may urge the deceleration mechanism 66 or the link mechanism 76. The elastic member according to the invention is not limited to a spring, but may be other types of elastic member such as elastic resin.

At the time of gear change, the rod 75 reciprocates in the direction indicated by an arrow C by the operation of the shift actuator 65, and the shift cam 79 rotates through a predetermined angle via the link mechanism 76. Then, the shift forks 61 move along the cam grooves 60 by a predetermined amount in the axial direction. As a result, a pair of the transmission gears 57, 59 are fixed to the main shaft 55 and the drive shaft 58, respectively, and thus driving force can be transmitted from the main shaft 55 to the drive shaft 58. While an electric motor can be used as the shift actuator 65 in some embodiments, other devices such as solenoid, an electromagnetic valve, or other devices can also be used.

The hydraulic transmission mechanism 64 connected with the clutch actuator 63 can include a clutch position sensor 68 for detecting a position of the clutch (e.g., a distance between the friction plates 54c and the clutch plates 54d) based on the detection of the stroke position of the piston. While the clutch position can be detected by the clutch position sensor 68 which detects the stroke position of the piston in some embodiments, the clutch position may be detected based on the detection of the position of the transmission mechanism provided between the clutch actuator 63 and the clutch 54.

For example, the clutch position can be detected based on the detection of the position of the rod 71 or the rack 74. The detection of the clutch position is not limited to indirect detection based on the detected stroke position of the piston as in the illustrated embodiment, but can be through direct measurement of the distance between the friction plates 54c and the clutch plates 54d using a sensor (not shown).

The drive shaft 58 can have a vehicle speed sensor 69. The shift cam 79 can have a gear position sensor 70 configured to detect the gear position (e.g., a rotational position of the shift cam 79).

The ECU 100 (engine control unit) can be configured to control the operations of the clutch actuator 63 and the shift actuator 65 in accordance with the operation of the shift-up switch 43a or the shift-down switch 43b to execute shift change. For example, the ECU 100 can be configured to execute a sequential processes involving starting gear change of the transmission gears 57, 59 by the shift actuator 65, disconnecting the clutch 54 by the clutch actuator 63 after elapse of a predetermined time from the start of gear change, and connecting the clutch 54 by the clutch actuator 63, in this order, under a predetermined program or a map at the time of running of the vehicle. However, the ECU 100 can be configured to execute other gear changing processes as well as other operations for the operation of the motorcycle 10.

Figure 4:
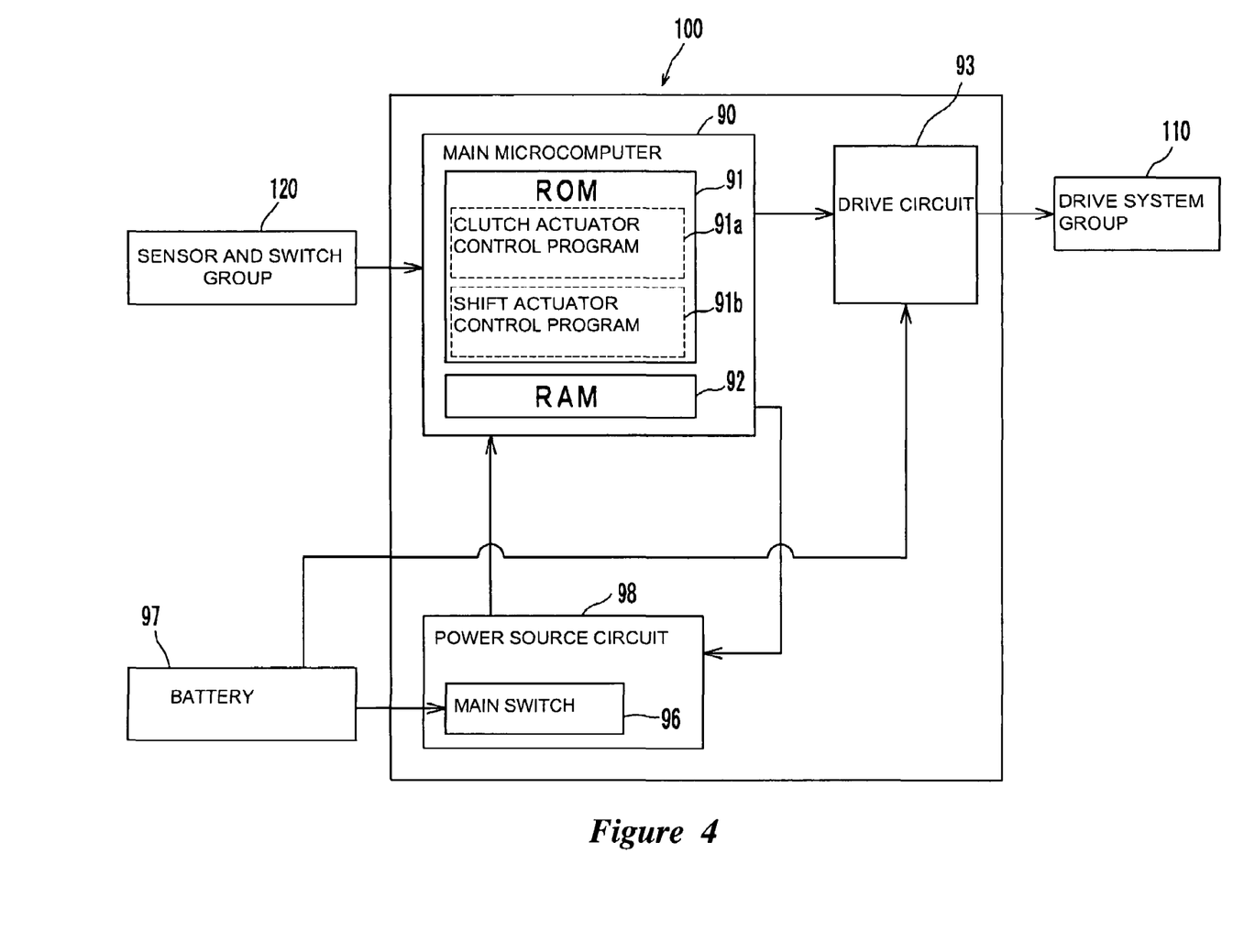
FIG. 4 is a block diagram illustrating a control system that can be used with the motorcycle of FIG. 1.

FIG. 4 is a block diagram illustrating an exemplary structure of a gear change controller that can be provided on the motorcycle 10 for performing gear changes. A drive system group 110 can be connected with a main microcomputer 90 contained in the ECU 100 via a drive circuit 93.

The ECU 100 can be considered as forming a control unit or a gear change controller. However, the gear change controller disclosed herein can also be constructed in other ways. For example, the gear change controller can be in the form of one or a plurality of hard-wired feedback control circuits. Alternatively, the gear change controller can be constructed of a dedicated processor and a memory for storing a computer program configured to perform the control routine of FIG. 7. Additionally, the gear change controller can be constructed of a general purpose computer having a general purpose processor and the memory for storing the computer program for performing the routine of FIG. 7. Preferably, however, the gear change controller is incorporated into the ECU 100, in any of the above-mentioned forms.

Figure 5:
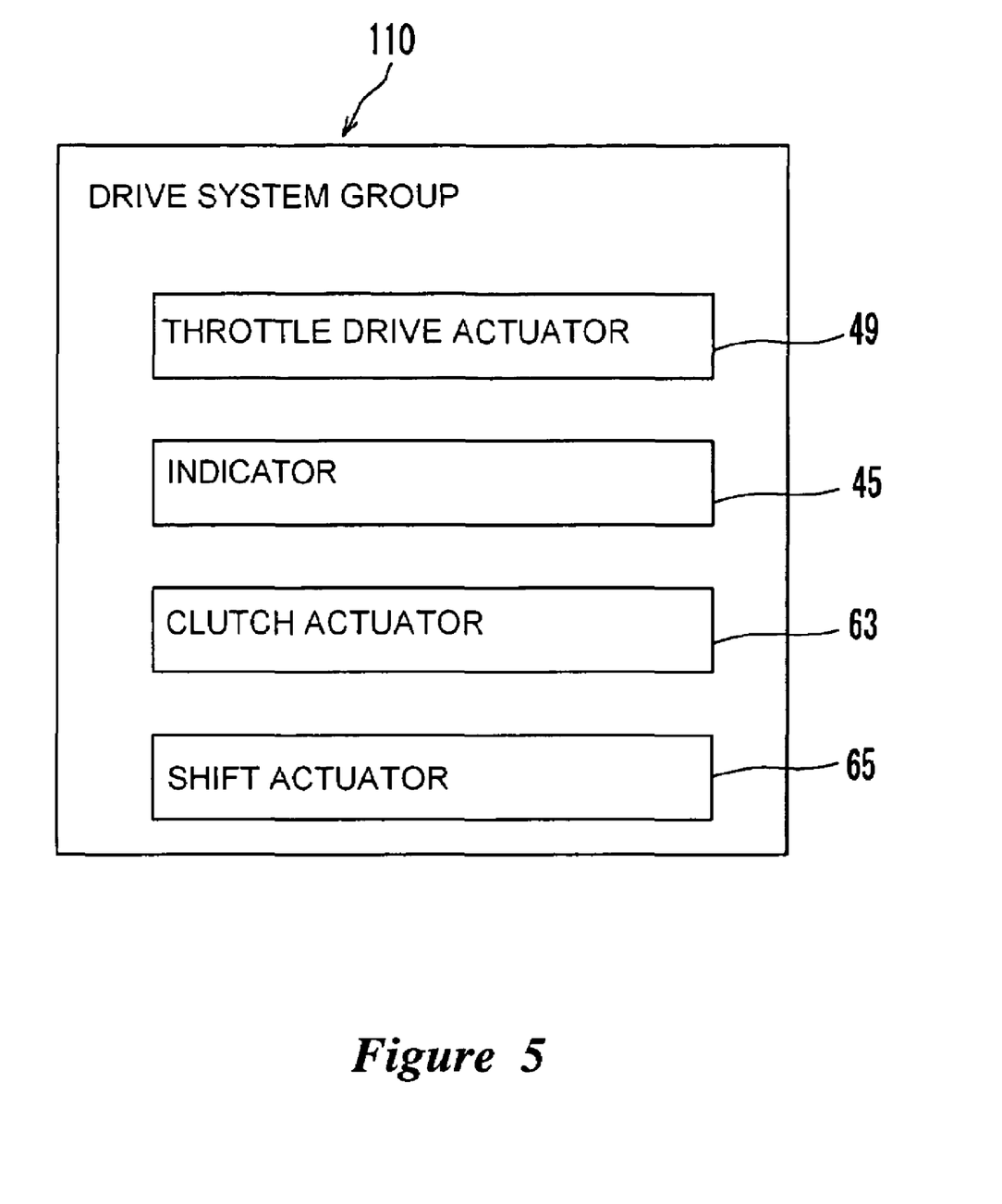
FIG. 5 is a block diagram illustrating a drive system group that can be use with the control system of FIG. 4.

As shown in FIG. 5, the drive system group 110 can include the throttle drive actuator 49, the indicator 45, the clutch actuator 63, and the shift actuator 65 (see also FIG. 2). The drive circuit 93 can be configured to supply appropriate electric current to the respective devices of the drive system group 110 from a battery 97 in response to drive signals sent from the main microcomputer 90. A sensor and switch group 120 can be connected with the main microcomputer 90.

Figure 6:
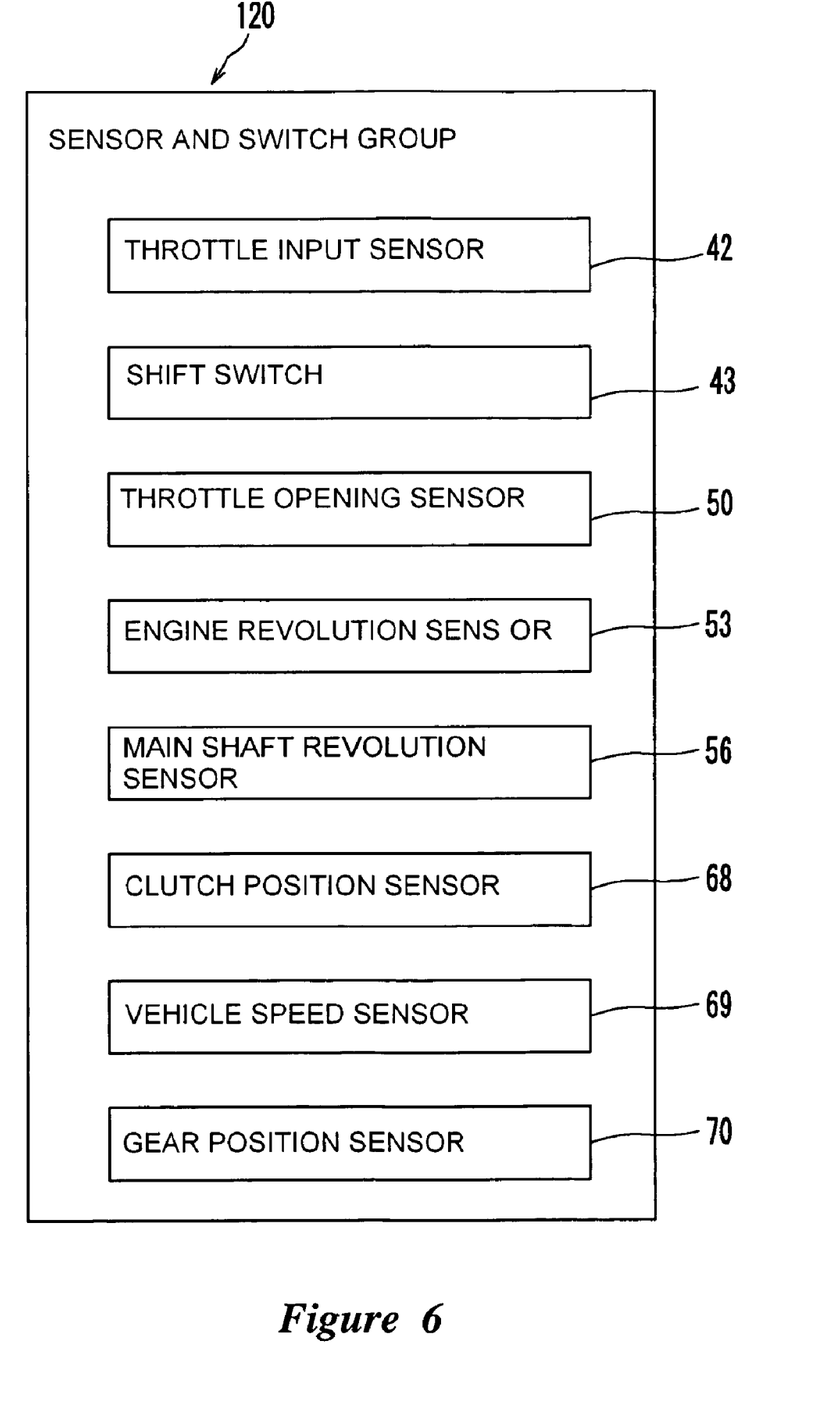
FIG. 6 is a block diagram illustrating a sensor and switch group that can be use with the control system of FIG. 4.

As shown in FIG. 6, the sensor and switch group can be constituted by the throttle input sensor 42, the shift switch 43, the throttle opening sensor 50, the engine revolution sensor 53, the main shaft revolution sensor 56, the clutch position sensor 68, the vehicle speed sensor 69, and the gear position sensor 70 (see also FIG. 2), as well as other sensors. The detection results from the respective sensors can be input to the main microcomputer 90, and then the main microcomputer 90 can supply drive signals to the respective devices constituting the drive system group 110 based on the detection results obtained from the respective sensors to control the operations of these devices.

The main microcomputer 90 can have a ROM 91 and a RAM 92. The ROM 91 can be used to store a clutch actuator control program 91a and a shift actuator control program 91b. The clutch actuator control program 91a can be a program for controlling the operation of the clutch actuator 63. The shift actuator control program 91b can be program for controlling the operation of the shift actuator 65. The ROM 91 can be constructed in a manner that makes it is impossible for a user to delete these programs stored in the ROM 91, or to write new programs or the like to the ROM 91. However, other types of memory can also be used.

For executing the clutch actuator control program 91a or the shift actuator control program 91b, either of these programs can be loaded into the RAM 92 and read by the main microcomputer 90. Then, the main microcomputer 90 controls the operation of the clutch actuator 63 or the shift actuator 65 under the program in the RAM 92.

A power source circuit 98 connected with the battery 97 can have a main switch 96 which can be turned on or off in accordance with the operation of a key switch (not shown). When the main switch 96 is turned on, the power source circuit 98 converts voltage of the battery 97 into driving voltage for the main microcomputer 90 and supplies the converted voltage to the main microcomputer 90.

Figure 7:
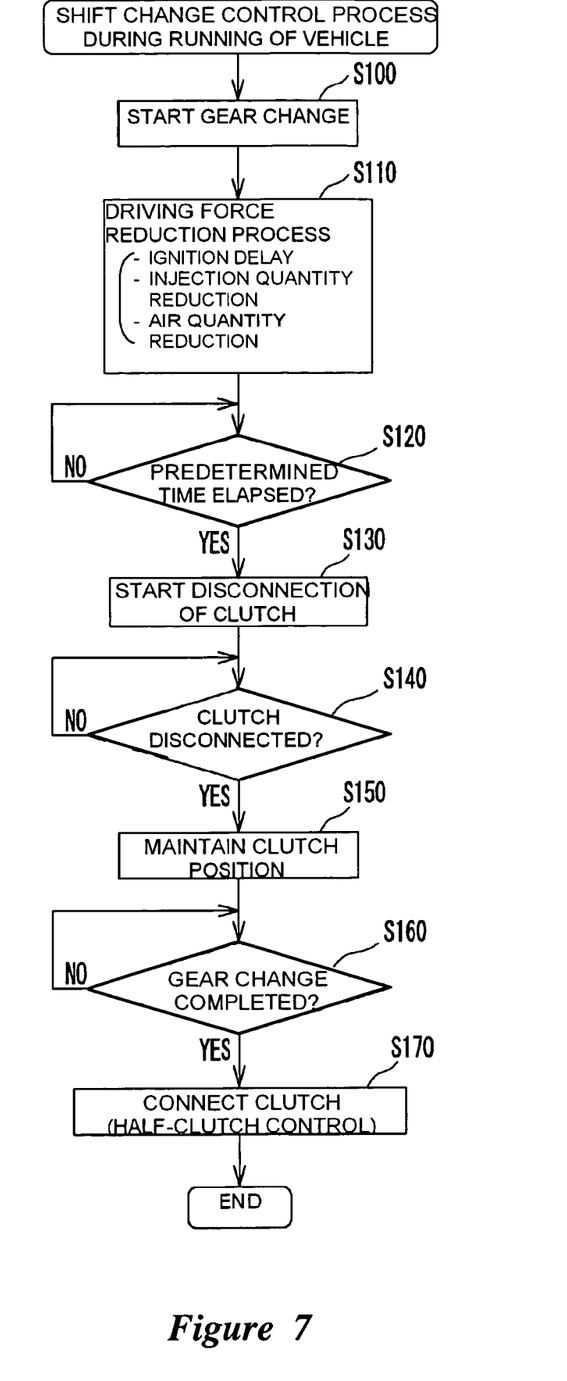
FIG. 7 is a flowchart showing a shift change control process that can be used for operating the control system of FIG. 4.

FIG. 7 is a flowchart illustrating a shift change control process that can be used during operation of a vehicle such as the motorcycle 10. When a shift change is requested by a rider of the motorcycle, e.g., when a rider operates the shift-up switch 43a or the shift-down switch 43b, the shift change control process of FIG. 7 can be used to carry out the rider's desire for a gear change. The procedures shown in FIG. 7 can be carried out for all gear changes.

In some embodiments, the shift change control process of FIG. 7 can be used only when the rider of the motorcycle 10 activates one of the switches 43a, 43b. Additionally, in some embodiments, the can be shift change control process of FIG. 7 can be performed automatically executed under predetermined conditions. For example, an up-shift, using the routine of FIG. 7, can be performed when the speed of the engine rises to a predetermined value without requiring the rider to active the shift-up switch 43a. On the other hand, a down-shift, using the routine of FIG. 7, can be performed when the speed of the engine falls to a predetermined level, without requiring the rider to active the shift-up switch 43b. Thus, the shift change control process may be automatically performed in response to so-called auto-shift commands.

With reference to the control routine illustrated in FIG. 7, initially, the ECU 100 starts gear change in step S100. In this step, the ECU 100 can supply a drive signal to the shift actuator 65 so that the shift actuator 65 initiates a gear change of the transmission gears 57, 59. With initiation of this step, the shift cam 79 starts rotating.

After step S100 is completed, a process for reducing engine driving force (driving force reduction process) can be carried out in step S110. In some embodiments, at least one of the three procedures described below can be performed in the driving force reduction process. While the driving force reduction process is conducted simultaneously with the initiation of gear change in step S100 in this embodiment, the driving force reduction process may be performed before starting gear change or after starting gear change according to the invention.

One of the optional driving force reduction processes can comprise delaying ignition. For this optional delaying ignition procedure, the ECU 100 can transmit a control signal to an ignition or spark plug control circuit (not shown) and can change the ignition timing of an spark plug is retarded (i.e., delayed) which can cause a reduction in power without interrupting the operation of the engine. Additionally, such an optional procedure can include delaying the opening timing of an air intake valve (not shown) until after the top dead center.

Another optional driving force reduction process can comprise reducing the fuel injection quantity. For reducing the injection quantity, for example, the ECU 100 can transmit a control signal to an injection valve control circuit (not shown) to reduce the fuel injection quantity supplied through a fuel injection valve. This can cause air-fuel mixtures delivered to the combustion chambers of the engine to be lean, thereby reducing the power output of the combustion resulting from the lean air/fuel mixtures, and thus reducing the power output of the engine.

Still another optional driving force reduction process can comprise reducing the air quantity. For reducing the air quantity, the ECU 100 can transmit a control signal to the electronically controlled throttle valves 46 (see FIG. 2) to control the opening of the throttle valves 46 and reduce the quantity of air passing through the air intake passage, and thereby reducing the power output of the engine.

Procedures for reducing driving force other than the above three procedures can also be performed. As noted above, one or a combination of any of the above-noted or other known procedures for reducing the driving force can be performed.

After the process in step S110 is completed, it can be determined whether a predetermined time has elapsed in step S120. In this step, ECU 100 judges whether the predetermined time has elapsed after gear change is initiated according to the process in step S100. When it is determined that the predetermined time has not elapsed yet, the routine returns to step S120 and waits until the predetermined time elapses.

When it is determined that the predetermined time has elapsed after the initiation of gear change in step S120, disengagement of the clutch can be started in step S130. As such, the disengagement of the clutch 54 is delayed for a predetermined time after the beginning of the gear change process of Step S100. In step S120, the ECU 100 can supply a driving signal to the clutch actuator 63 to cause the clutch actuator 63 to disconnect the clutch 54. When this step is conducted, the clutch 54 can be brought into disengagement at a fixed speed until the clutch 54 comes to a predetermined clutch position.

After the process in step S130 is completed, it can be determined whether the clutch is in the disengagement condition in step S140. In this step, the ECU 100 can judge whether the position of the clutch 54 is at the disengagement position based on the detection result from the clutch position sensor 68 (FIG. 2). When it is determined that the clutch 54 is not in the disengagement condition, the routine returns to step S140 and waits until the clutch 54 reaches the disengagement condition.

When it is determined that the clutch 54 is in the disengagement condition in the step S140, a process for maintaining the clutch position can be performed in step S150. In this process, the ECU 100 executes a process for maintaining the clutch position determined as the position of disengagement condition in step S140. By this process, the clutch 54 can be maintained under the disengagement condition.

After the process in step S150 is completed, it can be determined whether gear has been completed in step S160. In this step, the ECU 100 judges whether gear change has been finished based on the detection result from the gear position sensor 70. When it is determined that gear change has not been completed, the routine returns to step S160 and waits until gear change is completed.

When it is determined that gear change has been completed in step S160, the clutch 54 can be connected in step S170. In this step, the ECU 100 can supply a drive signal to the clutch actuator 63 to cause the clutch actuator 63 to connect the clutch 54. In step S170, half-clutch control under which the clutch 54 can be gradually connected can be performed from the time when the connection of the clutch 54 is started until the time when the clutch 54 reaches the predetermined clutch position. After execution of the process in step S170, the shift change control process during running of the vehicle is completed.

Figure 8:
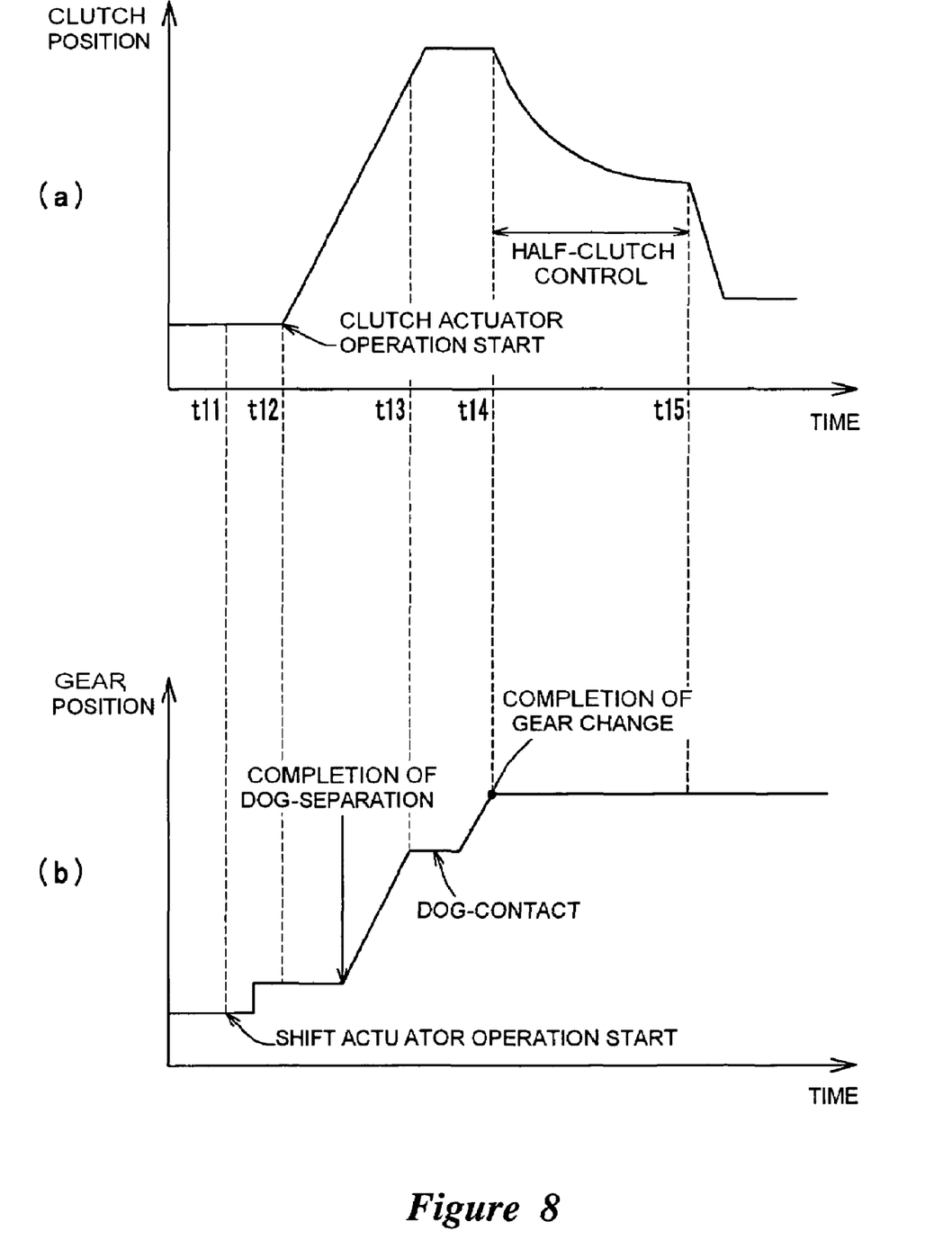
FIGS. 8(a) and 8(b) are timing diagrams showing exemplary control of clutch position and gear position, respectively.
Figure 9:
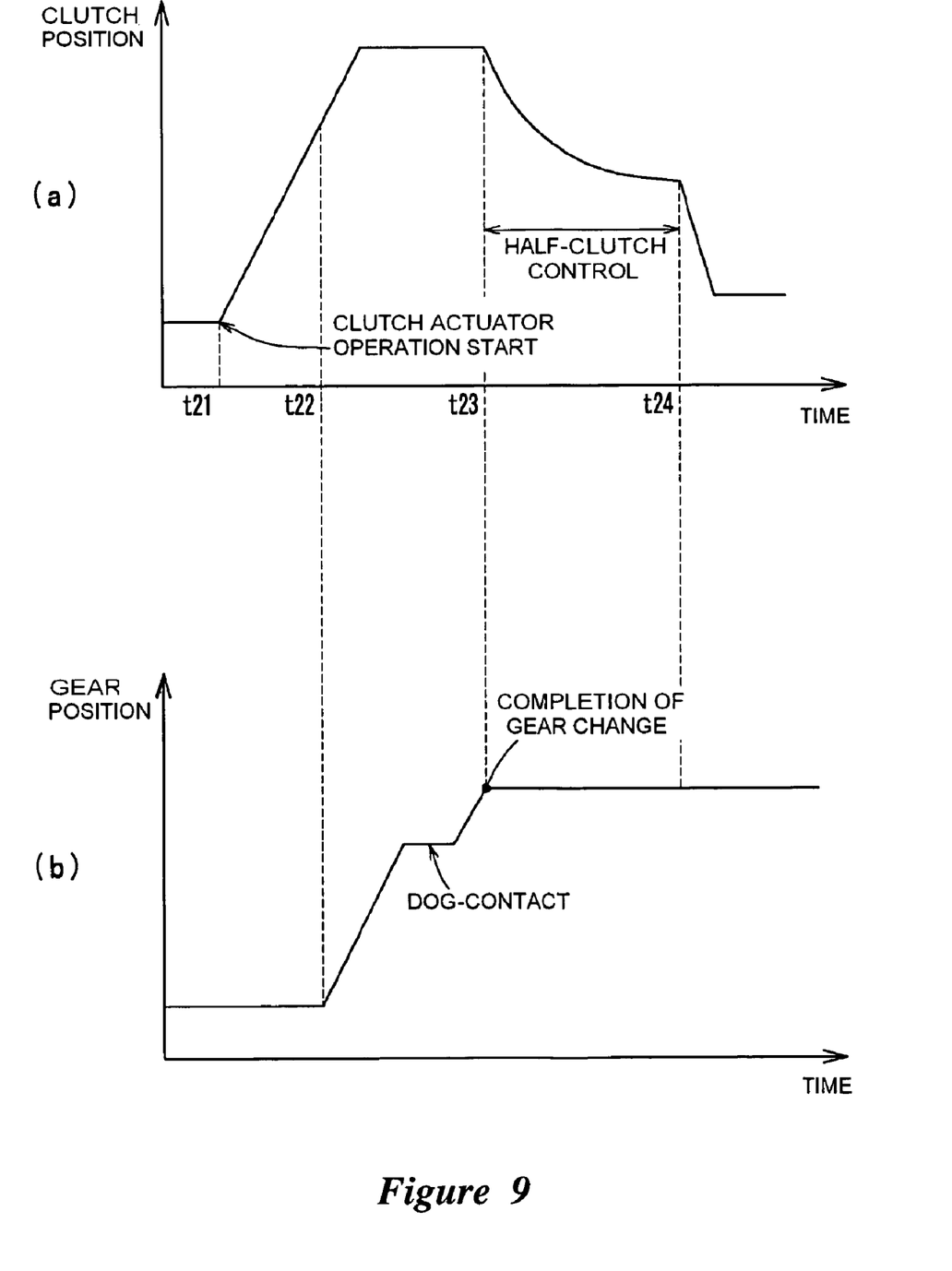
FIGS. 9(a) and 9(b) are timing diagrams showing control of clutch position and gear position, respectively, provided by systems known in the related art.

FIGS. 8(a) and 8(b) show the clutch position and gear position with elapse of time when the shift change control process during running of the vehicle shown in FIG. 7 is executed. FIGS. 9(a) and 9(b) show the clutch position and gear position with elapse of time at the same of shift change during running of a motorcycle according to the related art.

FIG. 9(a) shows the clutch position from the beginning to the end of shift change. FIG. 9(b) shows the gear position with elapse of time from the beginning to the end of shift change. As shown in FIG. 9(a), conventionally, gear change is started (time t22) after elapse of a predetermined time from the initiation of disengagement of the clutch 54 (time t21). After the clutch 54 is brought to the disengagement condition, this condition is maintained at this clutch position and completion of gear change is detected (time t23). Then, after half-clutch control (time t24), the clutch 54 is connected. In the related art, therefore, disengagement of the clutch 54 is initially started after initiation of shift change, and then gear change is started after elapse of the predetermined time from the initiation of disengagement.

On the other hand, according to the motorcycle 10 in some embodiments shown in FIGS. 8(a) and 8(b), gear change is initially started after initiation of shift change (time t11). In addition, the driving force reduction process (FIG. 7, step S110) can be started simultaneously with the initiation of gear change. The driving force reduction process can reduce driving force transmitted to the main shaft 55. Thus, the engaging first gear 57a and second gear 57b can be easily separated (dog-separated) at a predetermined clutch position (half-clutch position) during the disengagement period of the clutch 54 which follows the driving force reduction process. Thus, in the step where the driving force transmitted to the main shaft 55 is gradually reduced by the disengagement of the clutch 54, the driving force reduction process can be a supplemental process for reducing the driving force for the main shaft 55.

After elapse of a predetermined time from the initiation of gear change (time t11), disconnection of the clutch 54 starts (time t12). When the gear position in the dog-separation condition at the lower position comes to a possible dog-contact condition at the higher position after the initiation of disengagement of the clutch 54 (time t13) or slightly after the possible dog-contact condition, the clutch 54 is brought into disengagement condition. Thus, at the time of engagement between the fist gear 57a and second gear 57b, driving force transmitted to the main shaft 55 can be reduced to almost zero. As a result, the gear-in condition can be smoothly achieved.

Then, the disengagement condition of the clutch 54 is maintained and completion of gear change is detected similarly to the case of FIGS. 9(a) and 9(b) (time t14). After half-clutch control, the clutch 54 is connected (time t15).

In some embodiments, as discussed with reference to FIGS. 8(a) and 8(b) and FIGS. 9(a) and 9(b), the shift actuator 65 is initially operated to start gear change when the shift change requiring operation is conducted during running of the vehicle. After elapse of the predetermined time from the initiation of gear change, the clutch actuator 63 is operated to start disconnection of the clutch 54. Thus, the disengagement period of the clutch 54 (see t12 through t15 in FIGS. 8(a) and 8(b)) is shorter than that according to the related art (t21 through t24 in FIGS. 9(a) and 9(b)). Since the disengagement period of the clutch 54 is short, the period of non-acceleration even at the time of operation the accelerator and the period of deceleration due to running resistance can be reduced. Accordingly, riding feeling given to the rider can be enhanced.

According to the motorcycle 10 in some embodiments, therefore, gear change is initially started when shift change is required during running of the vehicle, and the disconnection of the clutch 54 is started after elapse of the predetermined time from the initiation of gear change. Thus, the disengagement period of the clutch 54 can be shortened. Accordingly, the period of non-acceleration even at the time of operation of the accelerator and the period of deceleration due to running resistance can be reduced, and thus riding feeling given to the rider can be enhanced.

In some embodiments, completion of gear change of the transmission 80 is detected by the gear position sensor 70 after the start of disconnection of the clutch 54, and half-control over the clutch 54 is started based on this detection. Thus, half-clutch control can be initiated after gear change is securely completed.

In some embodiments, the spring 85 for urging the rod 75 in accordance with the operation of the shift actuator 65 is provided. Thus, when the dog-separation is carried out with the clutch 54 engaging, large reaction force given from the first gears 57 and 59 can be eliminated. Additionally, force applied to the rod 75 can be maintained at a constant level.

In some embodiments, the driving force reduction process (at least one of the procedures for delaying ignition, reducing the injection quantity, and reducing the air quantity) is also performed at the time of shift change. Thus, driving force transmitted to the main shaft 55 through the clutch 54 can be reduced. Accordingly, dog-separation can be easily carried out at the half-clutch position during the disengagement period of the clutch 54.

In some embodiments, it is determined whether gear change has been completed after the clutch 54 is brought into disengagement condition. When it is determined that gear change has been completed, the process goes to the clutch connecting step. In this case, the clutch 54 is temporarily in the disengagement condition when gear change is completed at any time during the disengagement period of the clutch 54, and thereafter the clutch 54 is connected. However, the clutch 54 may be promptly connected when gear change is completed by monitoring the gear position simultaneously with the initiation of gear change.

Figure 10:
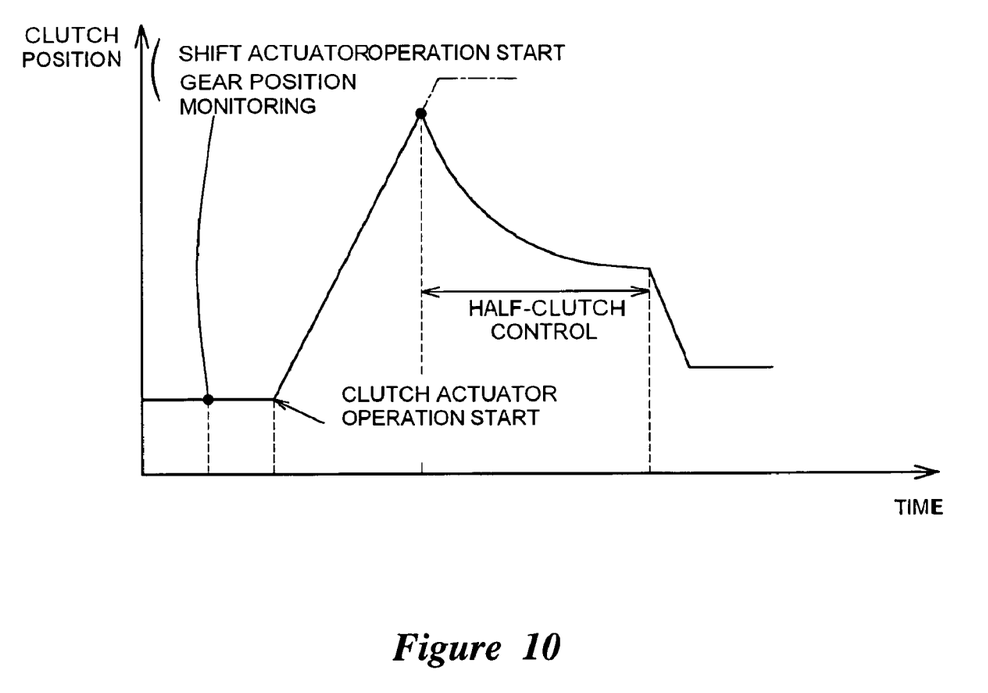
FIG. 10 is a timing diagram showing a modification of the clutch position control illustrated in FIGS. 8(a) and 8(b).

For example, FIG. 10 shows the clutch position with elapse of time during shift change in a motorcycle in a modified example. In the motorcycle operation shown in FIG. 10 in this modified example, the gear position sensor 70 starts monitoring the gear position simultaneously with the start of operation of the shift actuator 65. When completion of gear change is detected during the disengagement period of the clutch 54, half-clutch control over the clutch 54 is initiated.

In the modified example shown in FIG. 10, therefore, the gear position is monitored from the initiation of gear change, and half-clutch control is promptly started when completion of gear change is detected. As a result, time required for disengagement of the clutch 54 can be reduced to the minimum in accordance with the respective running conditions such as accelerating and climbing a slope. Accordingly, time required for shift change can be shortened.

What is claimed is:

1. An automated transmission controller, comprising:
   a friction clutch;
   a transmission having a plurality of first gears on which engaging projections are formed and a plurality of second gears on which engaging concaves are formed, the engaging concaves configured to be engaged with the engaging projections, the transmission being configured to effect gear changes through the engagement of the engaging projections of the first gears with the engaging concaves of the second gears;
   a clutch actuator configured to connecting and disconnecting the friction clutch;
   a shift actuator configured to cause at least one of the first and second gear to move so as to engage the engaging projections with the engaging concaves and thereby executing a gear change of the transmission; and
   a control unit configured to control operations of the clutch actuator and the shift actuator;
   wherein the control unit is configured to initially operate the shift actuator to start a gear change of the transmission and then to operate the clutch actuator to start disconnection of the friction clutch.

2. An automated transmission controller according to claim 1, wherein the control unit is configured to operate the clutch actuator to start disconnection of the friction clutch after an elapse of a predetermined time from an initiation of a gear change of the transmission.

3. An automated transmission controller according to claim 2, wherein the predetermined time is measured as beginning from an initiation of the shift actuator to execute a gear change.

4. An automated transmission controller according to claim 2, wherein the shift actuator is an electronic actuator and the predetermined time is measured as beginning from an initiation of an electronic signal transmitted to the shift actuator.

5. An automated transmission controller according to claim 1 additionally comprising a gear position sensor configured to detect a gear position of the transmission, the control unit being configured to cause the clutch to transition from a disconnected state to a connected state based on an output of the gear position sensor indicating a gear change completion of the transmission.

6. An automated transmission controller according to claim 1, further including a resilient member for urging a power transmission mechanism disposed between the shift actuator and the transmission in accordance with the operation of the shift actuator.

7. An automated transmission controller according to claim 1, wherein the automated transmission controller is mounted on a vehicle having an engine and the control unit is configured to execute a driving force reduction process for reducing engine driving force at the time of shift change.

8. An automated transmission controller according to claim 7, wherein the control unit is configured to execute the driving force reduction process simultaneously with the initiation of gear change of the transmission by the shift actuator.

9. An automated transmission controller according to claim 7, wherein the control unit is configured to execute the driving force reduction process after an elapse of a predetermined time from the initiation of gear change of the transmission by the shift actuator.

10. An automated transmission controller according to claim 7, wherein the control unit is configured to execute the driving force reduction process a predetermined time before the initiation of gear change of the transmission by the shift actuator.

11. An automated transmission controller according to claim 7, wherein the driving force reduction process is a process for delaying ignition.

12. An automated transmission controller according to claim 7, wherein the driving force reduction process is a process for reducing the fuel injection quantity.

13. An automated transmission controller according to claim 7, wherein the vehicle includes an electronically controlled throttle valve provided within an air passage of the engine, and wherein the driving force reduction process comprises reducing the air quantity by controlling the opening of the electronically controlled throttle valve.

14. An automated transmission controller according to claim 1 additionally comprising a gear position sensor configured to detect a gear position of the transmission, wherein the control unit is configured to operate the clutch actuator to connect the friction clutch before completion of disconnection of the friction clutch when completion of gear change is detected by the gear position sensor during the period from the initiation of disconnection of the friction clutch to completion of the disconnection.

15. An automated transmission controller according to claim 1 in combination with a vehicle having a propulsion device configured to propel the vehicle, the transmission configured to transfer propulsion energy to the propulsion device.

16. An automated transmission controller according to claim 15, wherein the vehicle a saddle-type vehicle.

17. An automated transmission controller comprising a friction clutch, a transmission having a plurality of gears defining a plurality of gear ratios, a clutch actuator configured to connecting and disconnecting the friction clutch, a shift actuator configured to cause the transmission to shift between the plurality of gear ratios, and means for initially operating the shift actuator to start a gear change of the transmission and then to operate the clutch actuator to start disconnection of the friction clutch based on a single gear shift command from a user of the transmission controller.

18. An automated transmission controller according to claim 17, additionally comprising an up-shift button and a down-shift button configured to allow a user to issue up-shift and down-shift commands to the means for initially operating.

19. An automated transmission controller according to claim 18, additionally comprising a clutch lever configured to allow a user of the transmission controller to issue separate commands for controlling the clutch actuator.

* * * * *

UNITED STATES PATENT AND TRADEMARK OFFICE
CERTIFICATE OF CORRECTION

PATENT NO. : 7,513,849 B2 Page 1 of 1
APPLICATION NO. : 11/514017
DATED : April 7, 2009
INVENTOR(S) : Kengo Minami It is certified that error appears in the above-identified patent and that said Letters Patent is hereby corrected as shown below:

On the Title Page in Item 56, page 2, line 45, under Foreign Patent Documents, please change "2006-017721" to --2006-017221--.

In column 3, approx. line 19, please change "can" to --can also--.

In column 3, approx. line 29, please change "immediate" to --intermediate--.

In column 4, line 41, please change "closes" to --close--.

In column 8, line 16, please change "be" to --be a--.

In column 9, line 64, before "step" please delete "the".

In column 10, line 4, please change "gear" to --gear change--.

In column 10, line 25, please change "same" to --time--.

In column 11, line 22, after "and" please change "the" to --then--.

In column 11, lines 32-33, please change "half-control" to --half-clutch--.

Signed and Sealed this

Twenty-seventh Day of April, 2010

David J. Kappos
*Director of the United States Patent and Trademark Office*